(12) United States Patent
Bruchmann et al.

(10) Patent No.: US 6,416,686 B2
(45) Date of Patent: Jul. 9, 2002

(54) POLYISOCYANATES

(75) Inventors: Bernd Bruchmann, Freinsheim; Hans Renz, Meckenheim; Rainer Königer, Freinsheim; Ulrike Ehe, Lambsheim; Ulrich Treuling, Bensheim; Rudolf Müller-Mall, Neuhofen, all of (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 09/811,201

(22) Filed: Mar. 16, 2001

(30) Foreign Application Priority Data

Mar. 17, 2000 (DE) .......................... 100 13 186

(51) Int. Cl.$^7$ ................................ C08G 18/30
(52) U.S. Cl. ............ 252/182.22; 560/25; 560/26; 560/27; 560/32; 560/115; 560/158; 528/85
(58) Field of Search .............. 252/182.22; 560/25, 560/26, 27, 32, 115, 158; 528/85

(56) References Cited

U.S. PATENT DOCUMENTS 4,332,742 A * 6/1982 Allen
4,463,143 A * 7/1984 Holubka
4,623,709 A 11/1986 Bauriedel

FOREIGN PATENT DOCUMENTS

| EP | 150444 | 8/1985 |
| EP | 1054030 | 11/2000 |
| GB | 2313839 | 12/1997 |

OTHER PUBLICATIONS

EPO Search Report Dated Jan. 11, 2002.
Translation of EPO Search Report dated Jan. 11, 2002.
* cited by examiner

*Primary Examiner*—Rachel Gorr
(74) *Attorney, Agent, or Firm*—Fernando A. Borrego

(57) ABSTRACT

Polyisocyanates are prepared by a process which comprises
(i) preparation of an addition product (A) which contains one group which is reactive toward isocyanate and one isocyanate group by reacting
  (a) a diisocyanate I with
  (b) compounds containing two groups which are reactive toward isocyanate, where at least one of the components (a) or (b) has functional groups having differing reactivities toward the functional groups of the other component,
(ii) if desired, intermolecular addition reaction of the addition product (A) to form a polyaddition product (P) which contains one group which is reactive toward isocyanate and one isocyanate group and
(iii) reaction of the addition product (A) and/or the polyaddition product (P) with a diisocyanate or polyisocyanate II which is different from diisocyanate I.

12 Claims, No Drawings

POLYISOCYANATES

The present invention relates to polyisocyanates based on two different diisocyanates or polyisocyanates and to a process for preparing them.

In industry, polyisocyanates can generally be advantageously used, inter alia, as building blocks for polyurethane production, e.g. for producing paints and varnishes, coatings, adhesives, sealants, pourable elastomers or foams.

Polyisocyanates based on different diisocyanates or diisocyanates and polyisocyanates can be used particularly advantageously for the abovementioned purposes, but their commercial availability is limited.

Thus, EP-A-755 954 describes the cotrimerization of tolylene diisocyanate (TDI) and hexamethylene diisocyanate (HDI) so as to obtain a polyisocyanate mixture containing isocyanurate groups for the production of polyurethane coating compositions. This product is meant to combine the positive properties of the two isocyanates in PU coating systems, high reactivity and hardness of the aromatic isocyanate and the light stability and resistance to chemicals of the aliphatic isocyanate. However, owing to the large reactivity differences between the aromatically bound and aliphatically bound NCO groups of the starting materials, this reaction gives a very nonuniform product mixture which comprises mainly the homotrimers of tolylene diisocyanate and of hexamethylene diisocyanate and only small proportions of the cotrimers. The reaction is continued to only a partial conversion and unreacted diisocyanates are subsequently removed from the reaction mixture by distillation under reduced pressure.

EP-A-47452 describes the cotrimerization of hexamethylene diisocyanate and isophorone diisocyanate (IPDI). Since the reactivities of the NCO groups of HDI and IPDI are not very different, the cotrimerization is successful here but gives an oligomer mixture having a random HDI/IPDI product distribution. Hereto, unreacted diisocyanate is removed from the reaction mixture by vacuum distillation after the reaction.

It is an object of the present invention to provide polyisocyanates which, owing to their defined structure, combine advantageous properties such as high reactivity, low viscosity and good solubility and can be prepared by simple means, i.e. if possible without work-up by distillation. A further object is to provide a process for preparing these polyisocyanates.

We have found that these objects are achieved by reacting an addition product (A) and/or a polyaddition product (P) which is obtainable by reacting a diisocyanate I with a compound which is reactive toward isocyanate and has one group which is reactive toward isocyanate and one isocyanate group with a diisocyanate or polyisocyanate II which is different from diisocyanate I.

The invention accordingly provides a process for preparing polyisocyanates, which comprises
  (i) preparation of an addition product (A) which contains one group which is reactive toward isocyanate and one isocyanate group by reacting
    (a) a diisocyanate I with
    (b) compounds containing two groups which are reactive toward isocyanate, where at least one of the components (a) or (b) has functional groups having differing reactivities toward the functional groups of the other component,
  (ii) if desired, intermolecular addition reaction of the addition product (A) to form a polyaddition product (P) which contains one group which is reactive toward isocyanate and one isocyanate group and
  (iii) reaction of the addition product (A) and/or the polyaddition product (P) with a diisocyanate or polyisocyanate II which is different from diisocyanate I.

The invention further provides the polyisocyanates prepared by this process.

The invention also provides for the use of the polyisocyanates of the present invention as building blocks for producing paints and varnishes, coatings, adhesives, sealants, pourable elastomers or foams and provides polyaddition products obtainable using the polyisocyanates of the present invention.

Possible diisocyanates I are the aliphatic, cycloaliphatic and aromatic isocyanates known from the prior art. Preferred diisocyanates I are diphenylmethane 4,4'-diisocyanate, tetramethylene diisocyanate, hexamethylene diisocyanate, dicyclohexylmethane 4,4'-diisocyanate, xylylene diisocyanate, tetramethylxylylene diisocyanate, dodecyl diisocyanate, 1,3- and 1,4-bis(isocyanatomethyl) cyclohexane, lysine alkyl ester diisocyanate, where alkyl is $C_1$-$C_{10}$-alkyl, 2,2,4- or 2,4,4-trimethylhexamethylene 1,6-diisocyanate and 1,4-diisocyanatocyclohexane.

Particular preference is given to diisocyanates having NCO groups of differing reactivity, for example tolylene 2,4-diisocyanate (2,4-TDI), diphenylmethane 2,4'-diisocyanate (2,4'-MDI), isophorone diisocyanate (IPDI), 2-butyl-2-ethylpentamethylene diisocyanate, 2-isocyanatopropylcyclohexyl isocyanate, 3(4)-isocyanatomethyl-1-methylcyclohexyl isocyanate, 1,4-diisocyanato-4-methylpentane, dicyclohexylmethane 2,4'-diisocyanate and 4-methylcyclohexane 1,3-diisocyanate (H-TDI).

Particular preference is also given to diisocyanates whose NCO groups initially have the same reactivity but in which addition of an alcohol or amine to a first NCO group induces a decrease in the reactivity of the second NCO group. Examples are isocyanates whose NCO groups are coupled via a delocalized electron system, e.g. phenylene 1,3- and 1,4-diisocyanate, naphthylene 1,5-diisocyanate, biphenyl diisocyanate, tolidine diisocyanate or tolylene 2,6-diisocyanate.

Possible diisocyanates and polyisocyanates II are all aliphatic, cycloaliphatic and aromatic isocyanates known from the prior art. Apart from the abovementioned diisocyanates and polyisocyanates, it is also possible to use, for example, oligoisocyanates or polyisocyanates which can be prepared from the abovementioned diisocyanates or mixtures thereof by coupling by means of urethane, allophanate, ureas, biuret, uretdione, amide, isocyanurate, carbodiimide, uretonimine, oxadiazinetrione or iminooxadiazinedione structures.

As diisocyanates and polyisocyanates II, particular preference is given to using diphenylmethane 4,4'-diisocyanate, mixtures of diphenylmethane diisocyanates and oligomeric diphenylmethane diisocyanates (polymeric MDI), phenylene 1,3- and 1,4-diisocyanate, isophorone diisocyanate, oligomers of isophorone diisocyanate containing isocyanurate, uretdione, urethane or allophanate groups, hexamethylene diisocyanate, oligomers of hexamethylene diisocyanate containing isocyanurate, uretdione, urethane, allophanate, iminooxadiazinedione or biuret groups, 4-isocyanatomethyloctamethylene 1,8-diisocyanate, oligomers of MDI containing urethane, allophanate, carbodiimide or uretonimine groups or oligomers of TDI containing urethane, allophanate, carbodiimide or uretonimine groups.

In general, the diisocyanates and polyisocyanates II used have a mean functionality of at least 2, in particular from 2 to 8. In a preferred embodiment, the diisocyanates or polyisocyanates II used are isocyanates having a mean functionality of more than 2, preferably from 2.1 to 5.

Both for the diisocyanates I and for the diisocyanates and polyisocyanates II, it is also possible to use mixtures of the isocyanates mentioned.

The compounds (b) having two isocyanate-reactive groups which are used in the preparation of the addition product (A) are selected from among compounds containing hydroxyl groups, mercapto groups or amino groups. Preference is given to hydroxyl groups and amino groups.

In the preparation of the addition product (A), it is likewise possible to use compounds (b) having two isocyanate-reactive groups selected from among the above-mentioned functional groups or mixtures thereof and having differing reactivities toward NCO groups. Preference is here given to compounds having one primary and one secondary or tertiary hydroxyl group, one hydroxyl group and one mercapto group or one hydroxyl group and one amino group in the molecule, since the reactivity of the amino group in the reaction with isocyanate is significantly higher than that of the hydroxyl group.

Preference is also given to isocyanate-reactive compounds whose functional groups which are reactive toward isocyanate initially have the same reactivity but in which addition of at least one isocyanate can induce a reactivity decrease in the second isocyanate-reactive group as a result of steric or electronic effects.

Examples of compounds (b) having two groups which are reactive toward isocyanate are ethylene glycol, diethylene glycol, triethylene glycol, 1,2- and 1,3-propanediol, neopentyl glycol, 1,2-, 1,3- and 1,4-butanediol, 1,2-, 1,3- and 1,5-pentanediol, hexanediol, propane-1,2-dithiol, butane-1, 2-dithiol, mercaptoethanol, mercaptopropanol, mercaptobutanol, ethylenediamine, tolylenediamine, isophoronediamine, cysteamine, ethanolamine, N-methylethanolamine, propanolamine, isopropanolamine, 2-(butylamino)ethanol, 2-(cyclohexylamino)ethanol, 2-amino-1-butanol, 2-(2'-aminoethoxy)ethanol or higher alkoxylation products of ammonia, 4-hydroxypiperidine, 1-hydroxyethylpiperazine, aminopropanethiol or bifunctional polyetherols or polyesterols. Particular preference is given to 1,2-propanediol, 1,2- and 1,3-butanediol, ethanolamine, propanolamine, mercaptoethanol, 4-hydroxypiperidine and 1-hydroxyethylpiperazine.

It is also possible to use mixtures of the compounds mentioned.

In the preparation of the addition product (A), it is necessary for the ratio of diisocyanate I to compounds (b) containing two groups which are reactive toward isocyanate to be equimolar, so that the resulting addition product (A) contains one group which is reactive toward isocyanate and one free NCO group.

The reaction to form the addition product (A) usually takes place at from −20 to 120° C., preferably from −15 to 100° C. In a preferred embodiment, the diisocyanate I is placed in the reaction vessel first and the compound (b) is added. The addition products (A) are usually not stable over a prolonged period and are therefore preferably reacted immediately after their preparation with the diisocyanate or polyisocyanate II.

In a preferred embodiment, the addition product (A) can be converted by means of an intermolecular addition reaction of the addition product (A) into a polyaddition product (P). Here, the isocyanate-reactive group of the addition product (A) adds onto the isocyanate group of a further molecule of the addition product (A). The number of molecules of the addition product (A) which are added to form a polyaddition product (P) is generally not restricted. From a practical point of view, the addition reaction is usually stopped before the polyaddition product (P) has, for example due to an excessively high molecular weight or for steric reasons, acquired disadvantageous properties such as an excessively high viscosity or an excessively poor solubility.

The resultant polyaddition products (P) have one group which is reactive toward isocyanate and one isocyanate group.

The intermolecular polyaddition reaction of an addition product (A) to form a polyaddition product (P) can usually be carried out in situ after the reaction to form the addition product (A) is complete by increasing the temperature.

Furthermore, it is also possible to add a suitable catalyst or a suitable catalyst mixture. Suitable catalysts are generally compounds which catalyze the urethane reaction, for example amines, ammonium compounds, organic aluminum compounds, organic tin compounds, organic titanium compounds, organic zirconium compounds or organic bismuth compounds.

Examples which may be mentioned are diazabicyclooctane (DABCO), diazabicyclononene (DBN) and diazabicycloundecene (DBU), titanium tetrabutoxide, dibutyltin dilaurate, zirconium acetylacetonate and mixtures thereof.

The catalyst is generally added in an amount of from 50 to 10,000 ppm by weight, preferably from 100 to 5000 ppm by weight, based on the amount of isocyanate used.

Furthermore, the intermolecular polyaddition reaction can be controlled both by addition of a suitable catalyst and by selection of a suitable temperature.

There are various possible ways of stopping the intermolecular polyaddition reaction. For example, the temperature can be reduced to a level at which the addition reaction ceases and the addition product (A) or the polyaddition product (P) is storage-stable.

In a preferred embodiment, a diisocyanate or polyisocyanate II is added to stop the polyaddition reaction (P) as soon as the intermolecular addition reaction of the addition product (A) has produced a polyaddition product (P) having the desired degree of polyaddition.

Reaction of the polyaddition product (P) with the diisocyanate or polyisocyanate II gives the polyisocyanates of the present invention.

As an alternative, the diisocyanate or polyisocyanate II can be added to an addition product (A) which has not yet been reacted in an intermolecular addition reaction to give a polyaddition product (P).

However, it is usually advantageous in industry to carry out the intermolecular addition reaction to at least a small extent, since small amounts of unreacted diisocyanate I may still be present as impurity in the addition product (A) and these impurities can then be incorporated into the polyaddition product (P) by means of the intermolecular polyaddition reaction.

The reaction of the diisocyanate I with compounds (b) containing two groups which are reactive toward isocyanate is generally carried out in an equimolar ratio. It is also possible to use the isocyanate-reactive component (b) in a small molar excess so as to bring about essentially complete reaction of the diisocyanate I. In both procedures, an advantage is that a possibly complicated removal of an unreacted diisocyanate I is dispensed with.

In the reaction of the addition product (A) and/or the polyaddition product (P) with the diisocyanate or polyisocyanate II, it is usual to react at least one isocyanate group of the diisocyanate or polyisocyanate II with the isocyanate-reactive group of the addition product (A) and/or the polyaddition product (P). In a preferred embodiment, at least 10%, in particular at least 40% and particularly preferably 50–100%, of the free isocyanate groups of the diisocyanate or polyisocyanate II are reacted with a corresponding number of equivalents of an addition product (A) and/or polyaddition product (P) to form the polyisocyanate of the present invention.

In a further embodiment, one isocyanate group of a diisocyanate or polyisocyanate II is firstly reacted with an addition product (A1) or a polyaddition product (P1), followed by reaction of at least one further isocyanate group of the diisocyanate or polyisocyanate II with an addition product (A2) or a polyaddition product (P2), with the addition products (A1) and (A2) or the polyaddition products (P1) and (P2) not being identical. In this embodiment, preference is given to using a diisocyanate or polyisocyanate II which has isocyanate groups of differing reactivity toward the isocyanate-reactive groups of the components (A) and/or (P).

The preparation of the polyisocyanates of the present invention is usually carried out in solvents. Here, it is generally possible to use all solvents which are inert toward the respective starting materials. Preference is given to using organic solvents such as diethyl ether, tetrahydrofuran, acetone, 2-butanone, methyl isobutyl ketone, ethyl acetate, butyl acetate, benzene, toluene, chlorobenzene, xylene, methoxyethyl acetate, methoxypropyl acetate, dimethylformamide, dimethylacetamide or solvent naphtha.

The preparation of the polyisocyanates of the present invention is usually carried out in a pressure range from 2 mbar to 20 bar, preferably at atmospheric pressure, in reactors or reactor cascades which can be operated batchwise, semicontinuously or continuously.

The abovementioned setting of the reaction conditions and possibly the choice of a suitable solvent enables the products according to the present invention to be processed further without further purification after their preparation.

The polyisocyanates obtained by the process of the present invention can, if required, also be made hydrophobic, made hydrophilic or their functional groups can be modified. For this purpose, the NCO-terminated products are reacted or partially reacted with, for example, fatty alcohols, fatty amines, hydroxycarboxylic acids, hydroxysulfonic acids, amino acids or monoalcohols containing acrylate groups, e.g. hydroxyethyl acrylate or hydroxyethyl methacrylate.

The isocyanate groups of the polyisocyanates of the present invention can also be present in capped form. Suitable capping agents for NCO groups are, for example, oximes, phenols, imidazoles, triazoles, pyrazoles, pyrazolinones, diketopiperazines, caprolactam, malonic esters or compounds as are mentioned in the publications by Z. W. Wicks, Prog. Org. Coat. 3 (1975), 73–99 and Prog. Org. Coat. 9 (1981), 3–28 and also in Houben-Weyl, Methoden der Organischen Chemie, Volume XIV/2, 61 ff., Georg Thieme Verlag, Stuttgart 1963.

The present invention makes it possible to obtain the desired properties of the polyisocyanates of the present invention by specific choice of the appropriate starting materials, in particular the diisocyanates I or diisocyanates or polyisocyanates II. Thus, the polyisocyanates of the present invention make it possible, for example, to combine positive properties of customary aromatic isocyanates with positive properties of customary aliphatic isocyanates or to combine the positive properties of customary aliphatic isocyanates with the positive properties of customary cycloaliphatic isocyanates.

If, for example, a polyisocyanate according to the present invention is prepared from HDI isocyanurate oligomer as diisocyanate or polyisocyanate II and TDI as diisocyanate I, this polyisocyanate molecule can, depending the choice of the amount of the isocyanate II, contain both aromatic and aliphatic NCO groups which have significantly different reactivities. These different NCO reactivities within a polyisocyanate molecule can then be utilized advantageously in industry.

If, for example, a polyisocyanate according to the present invention is prepared from HDI isocyanurate oligomer as diisocyanate or polyisocyanate II and IPDI as diisocyanate I, then a PU coating composition produced using this polyisocyanate can have both properties such as elasticity and flexibility and properties such as hardness, scratch resistance and resistance to chemicals.

A further advantage of the process of the present invention is that it can be carried out economically. Both the reaction of diisocyanate I to form an addition product (A) and/or polyaddition product (P) and the reaction of (A) or (P) with a diisocyanate or polyisocyanate II to give the polyisocyanate of the present invention can be carried out in one reaction apparatus and without a distillation step, which is technically and economically advantageous.

The present invention is illustrated by the following examples.

EXAMPLES

Example 1

Preparation of an addition product (A) having a mean OH and NCO functionality of 1 from IPDI and ethanolamine 1000 g of IPDI were dissolved in 270 g of dimethylacetamide (DMAc) and cooled to 0° C. under a blanket of nitrogen. At this temperature, 270 g of ethanolamine dissolved in 1000 g of DMAc were added with good stirring over a period of 10 minutes and the reaction mixture was stirred at 0° C. for another 30 minutes. After this time, the reaction product had an NCO content of 7.4% by weight and a mean NCO functionality of 1 and a mean OH functionality of 1.

Example 2

Preparation of a polyaddition product (P) having a degree of polymerization of 3 and a mean OH and NCO functionality of 1 from IPDI and ethanolamine 1000 g of IPDI were dissolved in 270 g of dimethylacetamide (DMAc) and cooled to 0° C. under a blanket of nitrogen. At this temperature, 270 g of ethanolamine dissolved in 1000 g of DMAc were added with good stirring over a period of 10 minutes and the reaction mixture was stirred at 0° C. for another 30 minutes. The product mixture was subsequently heated to 60° C. and 200 mg of dibutyltin dilaurate (DBTL) were added. The NCO content of the mixture decreased continuously as the molar mass increased. At an NCO content of 2.4% by weight, the product had a mean degree of polymerization of 3 and a mean NCO functionality of 1 and a mean OH functionality of 1.

Example 3

Preparation of an addition product (A) having a mean OH and NCO functionality of 1 from IPDI and 1,3-butanediol 1000 g of IPDI were dissolved in 1000 g of butyl acetate at room temperature (23° C.) under a blanket of nitrogen. 200 mg of dibutyltin dilaurate were added, after which a mixture of 405 g of 1,3-butanediol and 405 g of butylacetate was added over a period of 20 minutes while stirring vigorously. The reaction mixture was stirred at room temperature and the decrease in the NCO content was followed titrimetrically. At an NCO content of 6.7% by weight, the reaction product had a mean NCO functionality of 1 and a mean OH functionality of 1.

Example 4
Preparation of a polyaddition product (P) having a degree of polymerization of 7 and a mean OH and NCO functionality of 1 from TDI and ethanolamine 174 g (1 mol) of TDI were dissolved in 522 g of dried dimethylacetamide (DMAc) and cooled to −15° C. At this temperature, 61 g (1 mol) of ethanolamine dissolved in 183 g of dried DMAc were added dropwise with good stirring over a period of 1 hour. The product mixture was slowly warmed to room temperature (23° C.) while stirring, during which time the NCO content of the mixture decreased continuously as the molar mass increased. At an NCO content of 0.64%, the reaction product had a mean degree of polymerization of 7 and a mean OH and NCO functionality of 1.

Example 5
Preparation of a polyisocyanate having a mean NCO functionality of 3.7 from IPDI, ethanolamine and HDI polyisocyanate Immediately after the addition product (A) from Example 1 had been prepared, 1700 g of BASONAT HI 100, dissolved in 1700 g of DMAc, and 400 mg of dibutyltin dilaurate were added to it, the mixture was heated to 40° C. and stirred at this temperature for 3 hours. The end product had an NCO content of 6.0% by weight and a viscosity of 170 mPas measured at 25° C. The mean molar mass of the polyisocyanate was 1457 g/mol and the mean functionality was 3.7.

BASONAT® HI 100, BASF: HDI polyisocyanate, viscosity about 3200 mPas, solids content=100%, NCO content=22% by weight.

Example 6
Preparation of a polyisocyanate having a mean NCO functionality of 3.7 from IPDI, 1,3-butanediol and HDI polyisocyanate Immediately after the addition product (A) from Example 3 had been prepared, 1720 g of BASONAT HI 100 dissolved in 1720 g of butyl acetate were added to it, the mixture was heated to 60° C. and stirred at this temperature for 3 hours. The end product had an NCO content of 6.0% by weight and a viscosity of 63 mPas measured at 25° C. The mean molar mass of the polyisocyanate was 1544 g/mol and the mean functionality was 3.7.

Example 7
Preparation of a polyisocyanate having a mean NCO functionality of 2.5 from IPDI, 1,3-butanediol and polymeric MDI Immediately after the addition product (A) from Example 3 had been prepared, 1240 g of LUPRANAT M 20 W, dissolved in 1240 g of butyl acetate, and 0.2 g of dibutyltin dilaurate were added to it, the mixture was heated to 60° C. and stirred at this temperature for 3 hours. The end product had an NCO content of 7.0% by weight and a viscosity of 45 mPas measured at 25° C. The mean molar mass of the polyisocyanate was 905 g/mol and the mean functionality was 2.5.

LUPRANAT® M 20 W, BASF: Polymeric MDI, viscosity about 200 mPas (25° C.), solids content=100%, NCO content=31% by weight.

We claim:
1. A process for preparing polyisocyanates, which comprises
   (i) preparation of an addition product (A) which contains one group which is reactive toward isocyanate and one isocyanate group by reacting
      (a) a diisocyanate I with
      (b) compounds containing two groups which are reactive toward isocyanate, where at least one of the components (a) or (b) has functional groups having differing reactivities toward the functional groups of the other component,
   (ii) optionally, intermolecular addition reaction of the addition product (A) to form a polyaddition product (P) which contains one group which is reactive toward isocyanate and one isocyanate group and
   (iii) reaction of the addition product (A) and/or the polyaddition product (P) with a diisocyanate or polyisocyanate II which is different from polyisocyanate I.

2. A process as claimed in claim 1, wherein the diisocyanate I used is tetramethylene diisocyanate, hexamethylene diisocyanate, dodecyl diisocyanate, 1,3- or 1,4-bis (isocyanatomethyl)cyclohexane, xylylene diisocyanate, tetramethylxylylene diisocyanate, diphenylmethane 4,4'-diisocyanate or a mixture thereof.

3. A process as claimed in claim 1, wherein the diisocyanate I is an isocyanate having two isocyanate groups of differing reactivity in first and second addition and is selected from the group consisting of tolylene 2,4-diisocyanate, tolylene 2,6-diisocyanate, diphenylmethane, 2,4'-diisocyanate, phenylene 1,3- and 1,4-diisocyanate, naphthylene 1,5-diisocyanate, tolidine diisocyanate, biphenyl diisocyanate, isophorone diisocyanate, 2-butyl-2-ethylpentamethylene diisocyanate, 2-isocyanatopropylcyclohexyl isocyanate, 3(4)-isocyanatomethyl-1-methylcyclohexyl isocyanate, 1,4-diisocyanato-4-methylpentane, 4-methylcyclohexane 1,3-diisocyanate, dicyclohexylmethane 2,4'-diisocyanate and mixtures thereof.

4. A process as claimed in claim 1, wherein the diisocyanate or polyisocyanate II is selected from the group consisting of tolylene 2,4-diisocyanate, tolylene 2,6-diisocyanate, diphenylmethane 4,4'-diisocyanate, diphenylmethane 2,4'-diisocyanate, mixtures of diphenylmethane diisocyanate and higher homologues of diphenylmethane diisocyanate (polymeric MDI), naphthylene 1,5-diisocyanate, tolidine diisocyanate, phenylene 1,3- and 1,4-diisocyanate, biphenyl diisocyanate, tetramethylene diisocyanate, hexamethylene diisocyanate, dodecyl diisocyanate, lysine alkyl ester diisocyanate, where alkyl is $C_1$-$C_{10}$alkyl, isophorone diisocyanate, 2-methylpentamethylene diisocyanate, 2,2,4- and 2,4,4-trimethylhexamethylene 1,6-diisocyanate, 1,3- and 1,4-diisocyanatocyclohexane, 3(4)-isocyanatomethyl-1-methyl-1-isocyanatocyclohexane, 2-butyl-2-ethylpentamethylene diisocyanate, 2-isocyanatopropylcyclohexyl isocyanate, 2- and 4-methylcyclohexane 1,3-diisocyanate, dicyclohexylmethane 4,4'- and 2,4'-diisocyanate, 1,3- and 1,4-bis (isocyanatomethyl) cyclohexane, xylylene diisocyanate, tetramethylxylylene diisocyanate, 4-isocyanatomethyloctamethylene 1,8-diisocyanate, triisocyanatotoluene and oligoisocyanates or polyisocyanates prepared from the isocyanates listed by coupling by means of urethane, allophanate, urea, biuret, uretdione, amide, isocyanurate, carbodiimide, uretonimine, oxadiazinetrione or iminooxadiazinedione structures and mixtures thereof.

5. A process as claimed in claim 1, wherein the diisocyanate or polyisocyanate II has a mean functionality of more than 2.

6. A process as claimed in claim 1, wherein, in the reaction of the addition product (A) and/or the polyaddition product (P) with the diisocyanate or polyisocyanate II, the ratio of isocyanate groups of the diisocyanate or polyisocyanate II to the isocyanate-reactive groups of the addition product (A) or the polyaddition product (P) is selected so that at least 10% of the NCO groups of the diisocyanate or polyisocyanate II are reacted.

7. A process as claimed in claim 1, wherein the isocyanate-reactive groups of the component (b) are selected from the groups consisting of hydroxyl groups, mercapto groups, amino groups and mixtures thereof.

8. A process as claimed in claim 1, wherein the compounds (b) having two groups which are reactive toward isocyanate are 1,2-propanediol, 1,2- and 1,3-butanediol, ethanolamine, propanolamine, mercaptoethanol, 4-hydroxypiperidine, 1-hydroxyethylpiperazine or a mixture thereof.

9. A polyisocyanate prepared according to the process recited in claim 1.

10. A polyisocyanate prepared according to the process recited in claim 1 and has both aliphatically and aromatically bound isocyanate groups.

11. A process as claimed in claim 1, wherein the diisocyanate or polyisocyanate II has a mean functionality of from 2.1 to 5.

12. A process as claimed in claim 1, wherein in the reaction of the addition product (A) and/or the polyaddition product (P) with the diisocyanate or polyisocyanate II, the ratio of isocyanate groups of the diisocyanate or polyisocyanate II to the isocyanate-reactive groups of the addition product (A) of the polyaddition product (P) is selected so that at least 40% of the NCO groups of the diisocyanate or polyisocyanate II are reacted.

* * * * *